US006726460B2

(12) United States Patent
Bailey et al.

(10) Patent No.: US 6,726,460 B2
(45) Date of Patent: Apr. 27, 2004

(54) COLLAPSIBLE MECHANISM FOR MOLDING A TIRE BEAD

(75) Inventors: David William Bailey, Anderson, SC (US); William George Steiner, Simpsonville, SC (US); Kevin James Peck, Simpsonville, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 117 days.

(21) Appl. No.: 10/123,795

(22) Filed: Apr. 16, 2002

(65) Prior Publication Data

US 2003/0194458 A1 Oct. 16, 2003

(51) Int. Cl.[7] .............................................. B29C 35/02
(52) U.S. Cl. .................................................... 425/36
(58) Field of Search ........................... 425/36; 264/315, 264/326, 501

(56) References Cited

U.S. PATENT DOCUMENTS

| 1,704,440 | A | | 3/1929 | Little |
| 2,904,832 | A | | 9/1959 | Frohlich et al. |
| 2,939,175 | A | | 6/1960 | Frohlich et al. |
| 3,153,263 | A | * | 10/1964 | Mallory et al. ............... 425/32 |
| 4,154,790 | A | | 5/1979 | Allitt |
| 4,545,750 | A | * | 10/1985 | Sarumaru ..................... 425/36 |
| 4,758,401 | A | | 7/1988 | Rach et al. |
| 5,127,811 | A | | 7/1992 | Trethowan |
| 6,238,193 | B1 | | 5/2001 | Bosseaux |

* cited by examiner

Primary Examiner—James P. Mackey
(74) Attorney, Agent, or Firm—Dority & Manning, P.A.

(57) ABSTRACT

A collapsible mechanism for molding the bead of a tire includes a series of sectors configured for radial and diagonal movement to selectively apply a continuous, uniform surface for molding and shaping the bead. The sectors collapse into a retracted, release position to allow for placement of the tire within and removal of the tire from the mold.

22 Claims, 7 Drawing Sheets

COLLAPSIBLE MECHANISM FOR MOLDING A TIRE BEAD

BACKGROUND OF THE INVENTION

The present invention relates to molds for tires. More particularly, the invention relates to a mold for shaping the beads of tires.

In tubeless, pneumatic tires the beads provide two functions: to anchor the tire to the wheel and to form a seal with the rim to close the air cavity. Conventional pneumatic tires rely on the exterior (relative to the tire cavity) portion of the tire bead to seat on the wheel rim for these functions. In certain types of tires, for example, vertically anchored tires such as the PAX brand tire available from Michelin North America, Inc., the interior portion of tire bead contacts the wheel rim to form the air seal.

To mold the interior portion of the tire bead, it is necessary to introduce a mold element in the interior of the tire. The tire molding art contains examples of bead molding parts that allow the uncured tire to be introduced into the mold without deforming the bead, and then expand to clamp on the bead for molding. For example, U.S. Pat. No. 6,238,193 to Bosseaux, which is commonly owned with the present invention, discloses a bead molding ring that includes radially moving parts and pivoting parts that mate in an expanded, molding position, and retract to allow the tire to be loaded and removed from the mold.

BRIEF SUMMARY OF THE INVENTION

Objects and advantages of the invention will be set forth in part in the following description, or may be obvious from the description, or may be learned from practice of the invention.

In one exemplary embodiment, the present invention provides a mold for a tire that includes a loading plate defining a cavity and having a central axis. A base is received within the cavity. The base has an engagement surface and is movable along the central axis. An actuator is also movable along the central axis between a spaced position and an engaged position relative to the base. The mold includes at least one sliding section movably attached to the engagement surface. The sliding section is movable in a direction perpendicular to the central axis between an engaged position and a retracted position, and has a molding surface for a tire bead. The mold also includes at least one floating section movably attached to the engagement surface and movable on a diagonal axis relative to the central axis between an engaged position and a retracted position. The floating section has a molding surface for a tire bead. Movement of the actuator from the spaced position to the engaged position moves the at least one sliding section and the at least one floating section to the respective engaged positions so that the respective molding surfaces join to form a continuous molding surface for the tire bead.

For the exemplary embodiment being discussed, the actuator may have a frustoconically shaped driving surface for mating contact with at least one sliding section and at least one floating section. Such sections in turn have frustoconically shaped follower surfaces for being driven by the actuator. Additionally, each of the floating sections and sliding sections may be configured with joining surfaces, which mutually bear on one another when the respective sections are in the engaged position. Such exemplary features allow the application of a uniform pressure by a continuous, sealed surface against the tire bead.

Accordingly, the tire bead may be molded into the desired shape and left with a smooth surface for forming an air tight seal.

In addition, this exemplary embodiment may be configured such that at least one floating section is biased to the retracted position spaced along the central axis from said base and radially inward toward the central axis. Furthermore, at least one sliding section may be configured such that it is biased to the retracted position radially inward toward the central axis.

In another exemplary embodiment of the present invention, a mold element for shaping a tire bead is provided and includes a platform having a support surface. A base resides over the platform and has a first surface and a second surface. The base is supported by a plurality of springs in mechanical communication with the first surface and the support surface. A plurality of floating sectors are connected to the second surface and are configured for simultaneous radial and axial movement. Each of floating sectors has a tire bead molding surface located along the outer radius and has a drive surface located along the inner radius. A plurality of radial sectors are connected to the second surface and are configured for radial movement. The radial sectors each have a tire bead molding surface positioned along the outer radius and each have a drive surface located along the inner radius. An actuator having a contacting surface is positioned over the base. Upon causing the actuator to move towards the platform, the contacting surface of the actuator contacts the drive surfaces to move the plurality of floating sectors and the plurality of radial sectors so as to cause the tire bead surfaces to form a uniform, sealed surface for application to the tire bead.

In another exemplary embodiment of the present invention, a mold element for a tire is provided that includes an annular disk comprised of a plurality of movable sectors. The annular disk has an axis about which the sectors are radially located. Each movable sector has a molding surface located along its outer radius that is configured for contact with a bead of the tire. At least one of the plurality of movable sectors is configured for radial movement between a release position and an engaged position. At least one of the plurality of movable sectors is configured for simultaneous radial and axial movement between a release position and an engaged position. An actuator is positioned above the annular disk and is configured for selectively acting upon the annular disk so as to move the plurality of movable sectors between the release position and the engaged position. Upon being placed into the engaged position, the mold surfaces of the plurality of movable sectors collectively form a continuous surface for molding the tire bead.

Another exemplary embodiment of the present invention provides a tire mold that includes a circular member having a series of alternately positioned radial sectors and diagonal sectors. The radial sectors are configured for movement in a radial direction between a release position, in which the tire may be placed upon or removed from the mold, and a secure position, in which a bead of the tire is in contact with the series of alternating radial sectors and diagonal sectors. The diagonal sectors are configured for movement simultaneously in both an axial direction and a radial direction between the release position and the secure position. An actuating member is positioned axially above the circular member and is configured for contacting the radial and diagonal sectors so as to selectively, reciprocally position the radial and diagonal sectors between the release position and the secure position. Upon being placed into the secure position, the series of radial and diagonal sectors collectively create a uniform surface for contacting and molding the bead of the tire.

These and other features, aspects and advantages of the present invention will become better understood with reference to the following description and appended claims. The accompanying drawings, which are incorporated in and constitute a part of this specification, illustrate an embodiment of the invention and, together with the description, serve to explain the principles of the invention. As will be understood by one of ordinary skill in the art using the teachings disclosed herein, the present invention as set forth in the claims herein exists in a variety of different embodiments that may be used to secure the position of a tire as needed.

DETAILED DESCRIPTION

Figure 1:
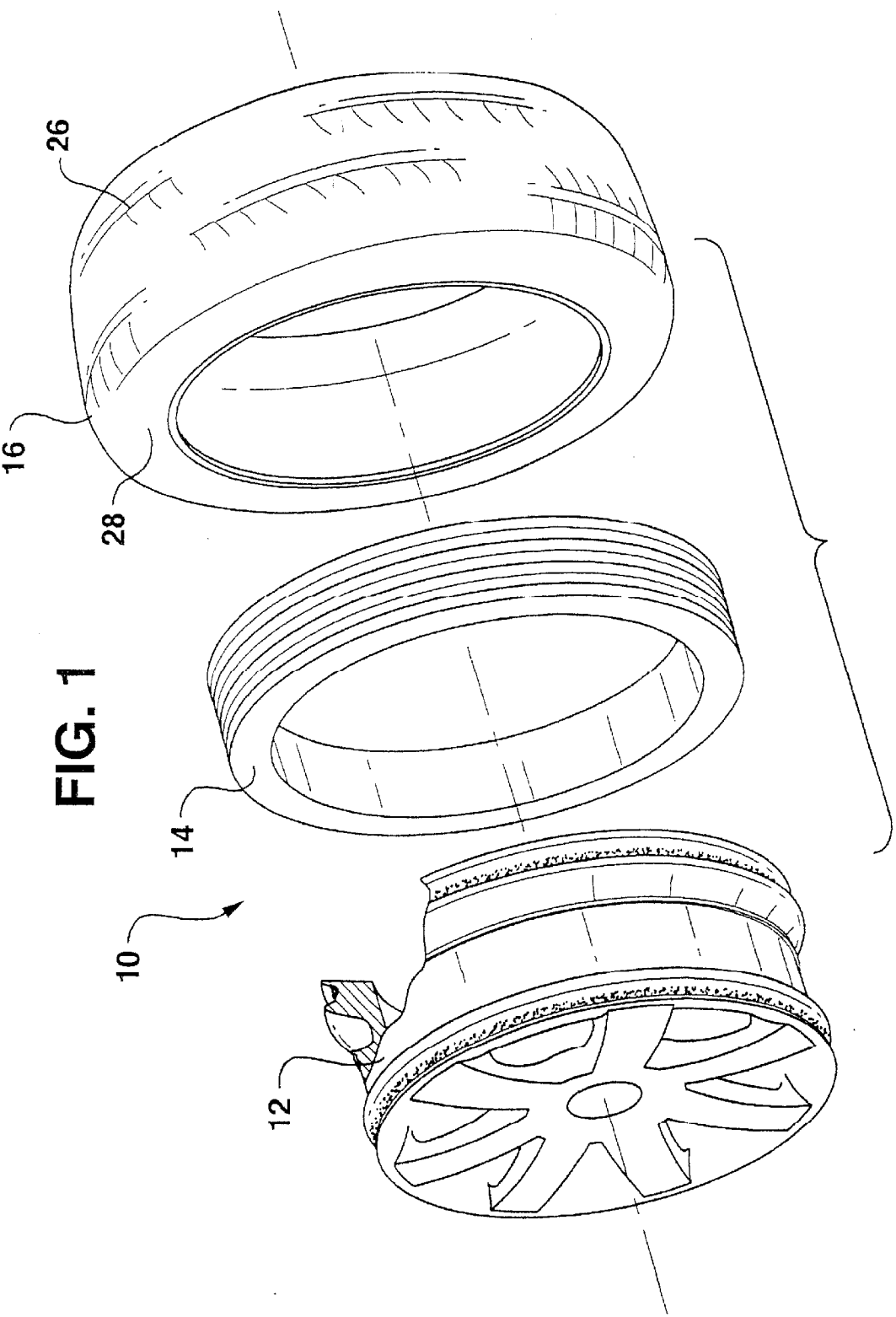
FIG. 1 is an exploded assembly view of an exemplary embodiment of a run-flat tire assembly.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Applicant's assignee is the owner of U.S. Pat. No. 5,891,279, entitled "Safety Support Made of a Flexible Elastomeric Material for Tires", which is incorporated herein by reference in its entirety for all purposes. Such patent illustrates exemplary embodiments of a run-flat tire having an insert in the shape of a ring disposed on a rim. The tire surrounds the insert and is vertically anchored onto the rim as is described in U.S. Pat. No. 5,634,993, entitled "Rim And Assembly Of Tire And Ring-Shaped Tread Support On Same" which is also owned by the assignee of the present invention and is incorporated by reference herein in its entirety for all purposes. Exemplary embodiments of the present invention will be described with reference to such run-flat tires. However, particular tire types are not a limiting feature of the disclosure and teachings herein as such may be used with a variety of tire designs as will be understood by one of ordinary skill in the art using such disclosure and teachings.

Figure 2:
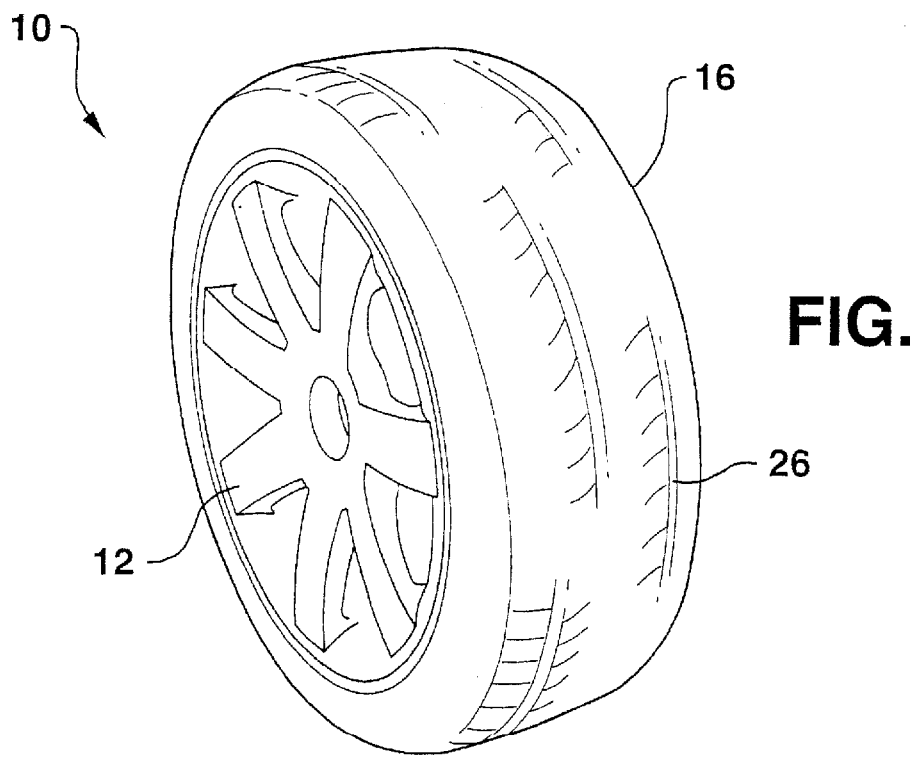
FIG. 2 is a perspective view of the tire assembly shown in FIG. 1.

Referring now to the drawings, an example of a run-flat tire assembly 10 is shown in FIG. 1. The tire assembly 10 is shown as being made of three basic components. First, an alloy or steel integral wheel rim 12 is provided onto which a support member 14 is placed. The support member 14 shown in FIG. 1 is a ring. Next, a rubber tire 16 is placed onto the rim 12 and completely surrounds the support member 14. The tire assembly 10 is shown in an assembled state in FIG. 2. The tire 16 is vertically anchored to the rim 12 as described in U.S. Pat. No. 5,634,993.

Figure 3:
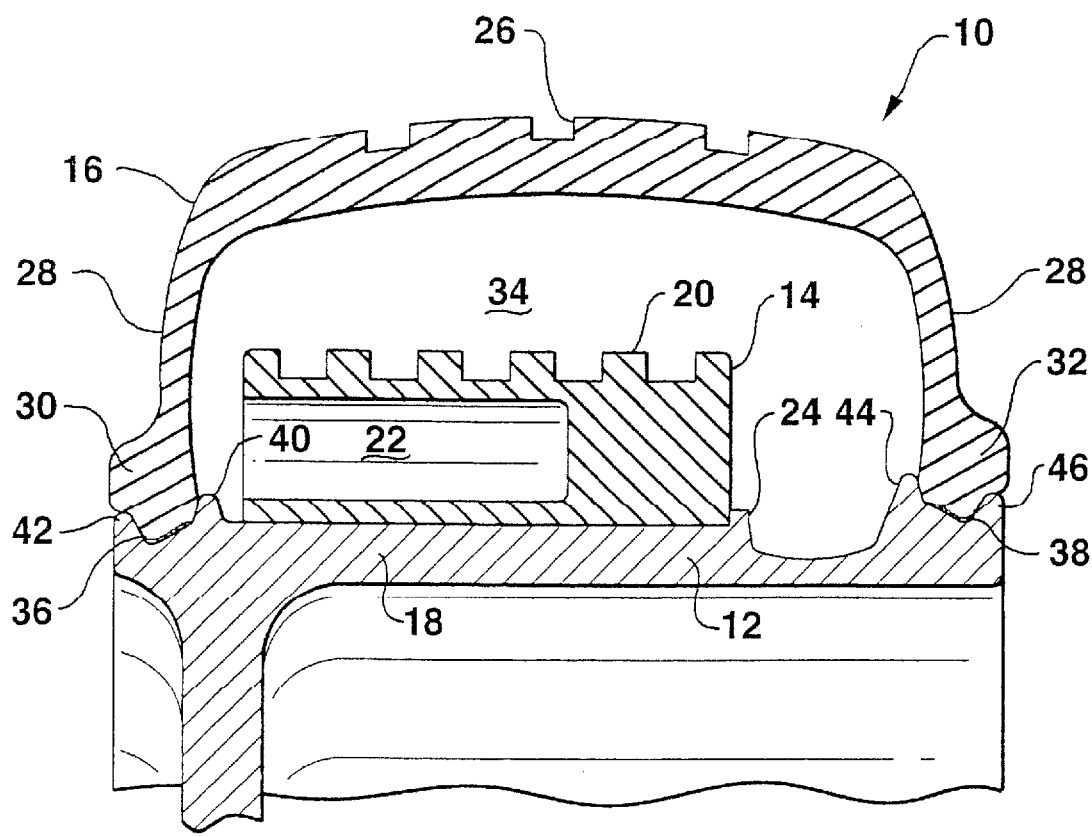
FIG. 3 a partial cross-sectional view of another exemplary embodiment of a run-flat tire assembly.
Figure 4:
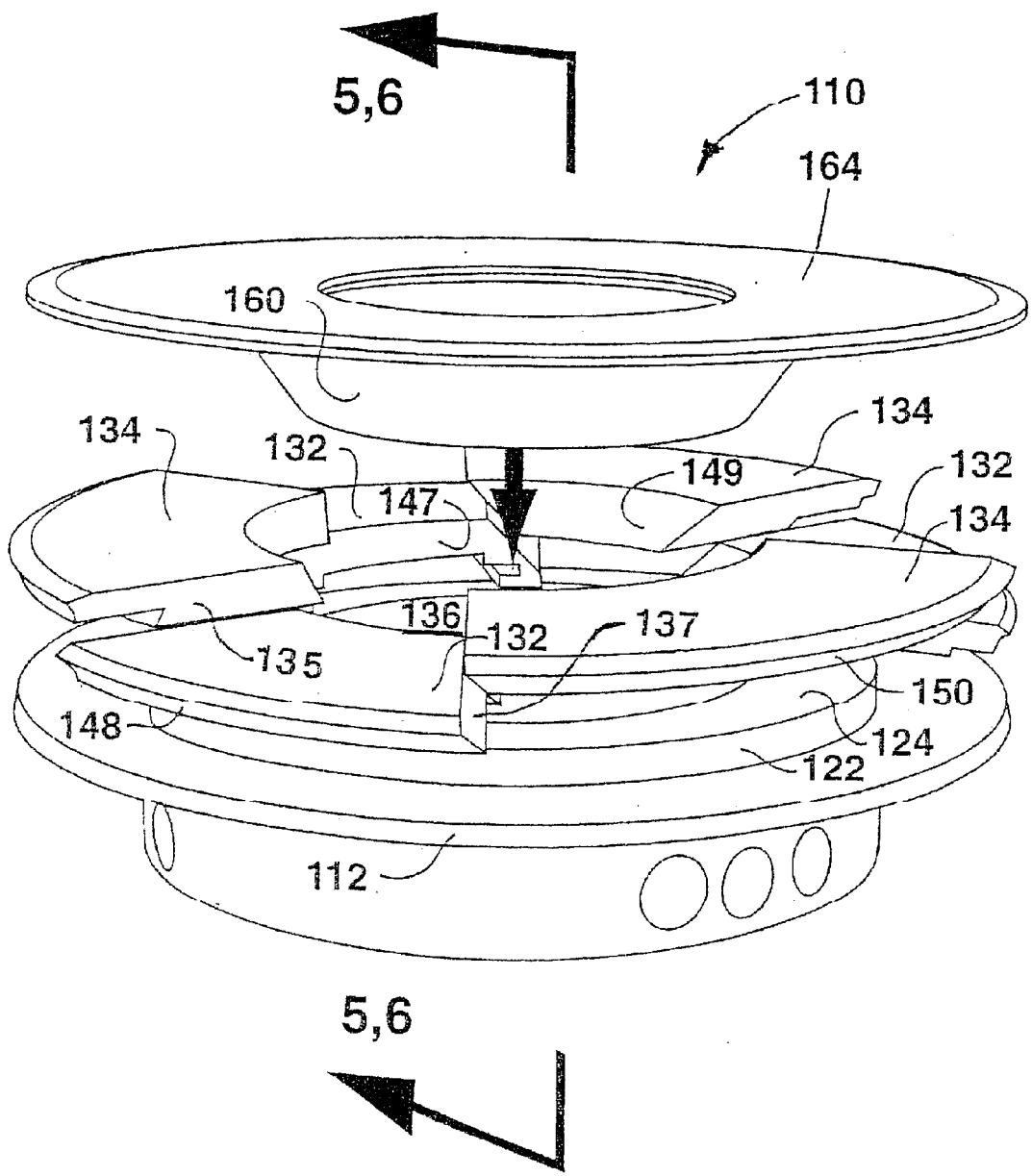
FIG. 4 is a partially exploded perspective view of an exemplary embodiment of the present invention.

FIG. 3 shows a partial cross sectional view of a tire assembly 10 in accordance with one exemplary embodiment of a run-flat tire assembly. As shown, the support member 14 is similar to that disclosed in the '279 patent mentioned above, and is located on a cylindrical section 18 of the rim 12.

As shown for the exemplary run-flat tire assembly of FIG. 3, tire 16 is provided with tire tread 26 on its outer surface. Two side walls 28 extend from the tire tread 26 portion of tire 16. For this exemplary embodiment for a run-flat tire assembly, the side walls 28 are substantially vertical in orientation once seated onto the rim 12. A first bead 30 is present at the end of one of the side walls 28, and a second bead 32 is present at the end of the other side wall 28. The beads 30, 32 keep the tire 16 attached to the rim 12 and also create an air seal to maintain air pressure in the space 34 formed between the tire 16 and rim 12.

Rim 12 has a first bead seat 36 and a second bead seat 38 formed therein for seating the first and second beads 30 and 32 respectively. The first bead seat 36 is formed by a pair of humps 40 and 42. The second bead seat 38 is formed by a pair of humps 44 and 46. An air seal is formed between the first bead 30 and the first bead seat 36. Similarly, an air seal is also formed between the second bead 32 and the second bead seat 38. These air seals prevent air from escaping around the beads 30 and 32 respectively.

During manufacturing, a mold element 110 must be introduced into the interior of the tire to mold the shape of tire bead 30 or 32. FIGS. 4 through 8 illustrate an exemplary embodiment of a mold element 110 for molding bead 32 of a tire 16. Mold element 110 is depicted in the open or collapsed position in FIG. 5 and FIG. 7. In such position, tire 16 may be removed from mold element 110. Conversely, mold element 110 is depicted in the closed or expanded position in FIG. 6 and FIG. 8. In this position, mold element 110 is contact with tire 17 and operates to form bead 32 into the desired shape.

Figure 7:
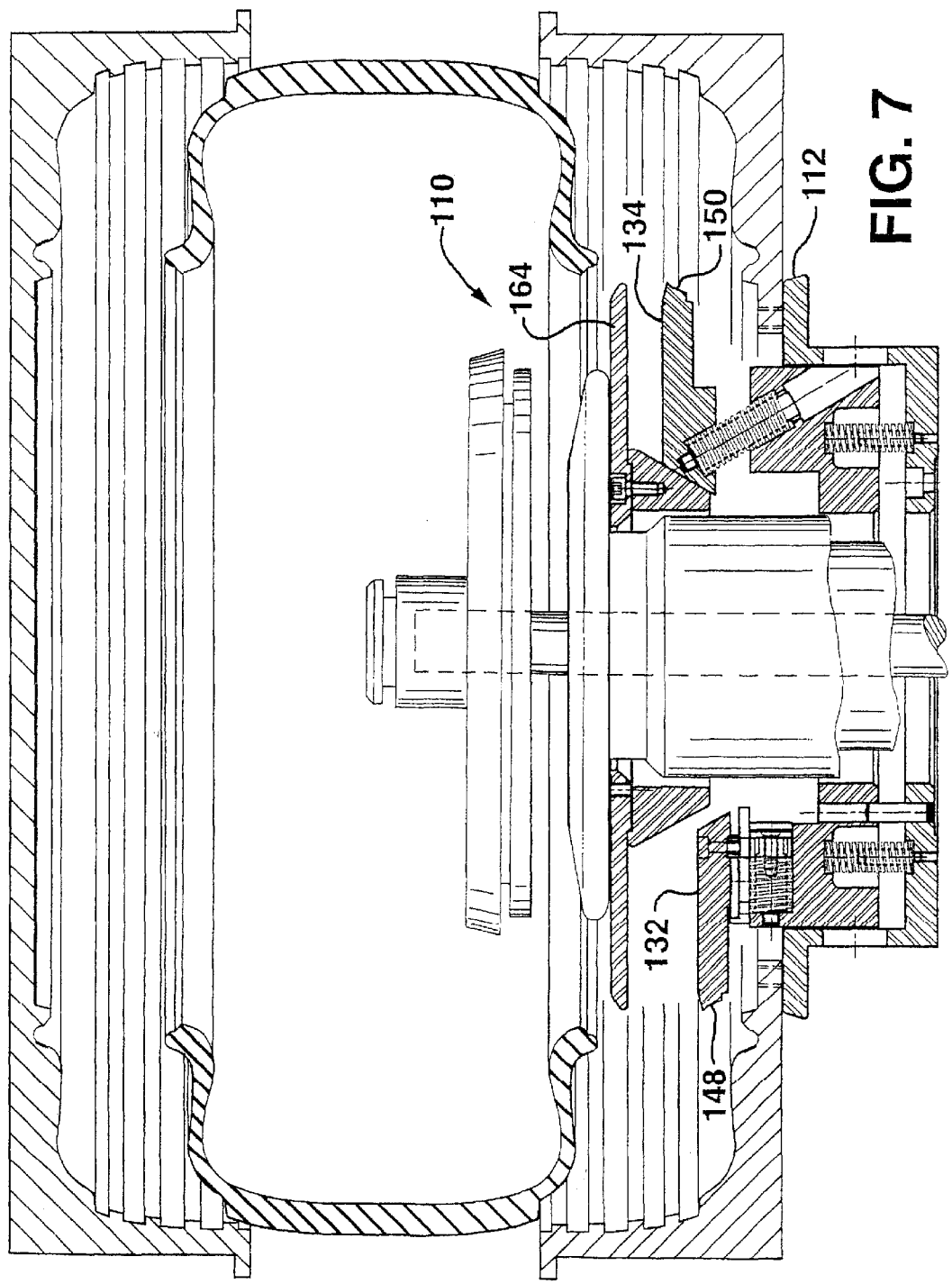
FIG. 7 is a cross-sectional view of an exemplary embodiment of the present invention in the collapsed or open position, and such embodiment is shown as it might be used with a curing press.
Figure 8:
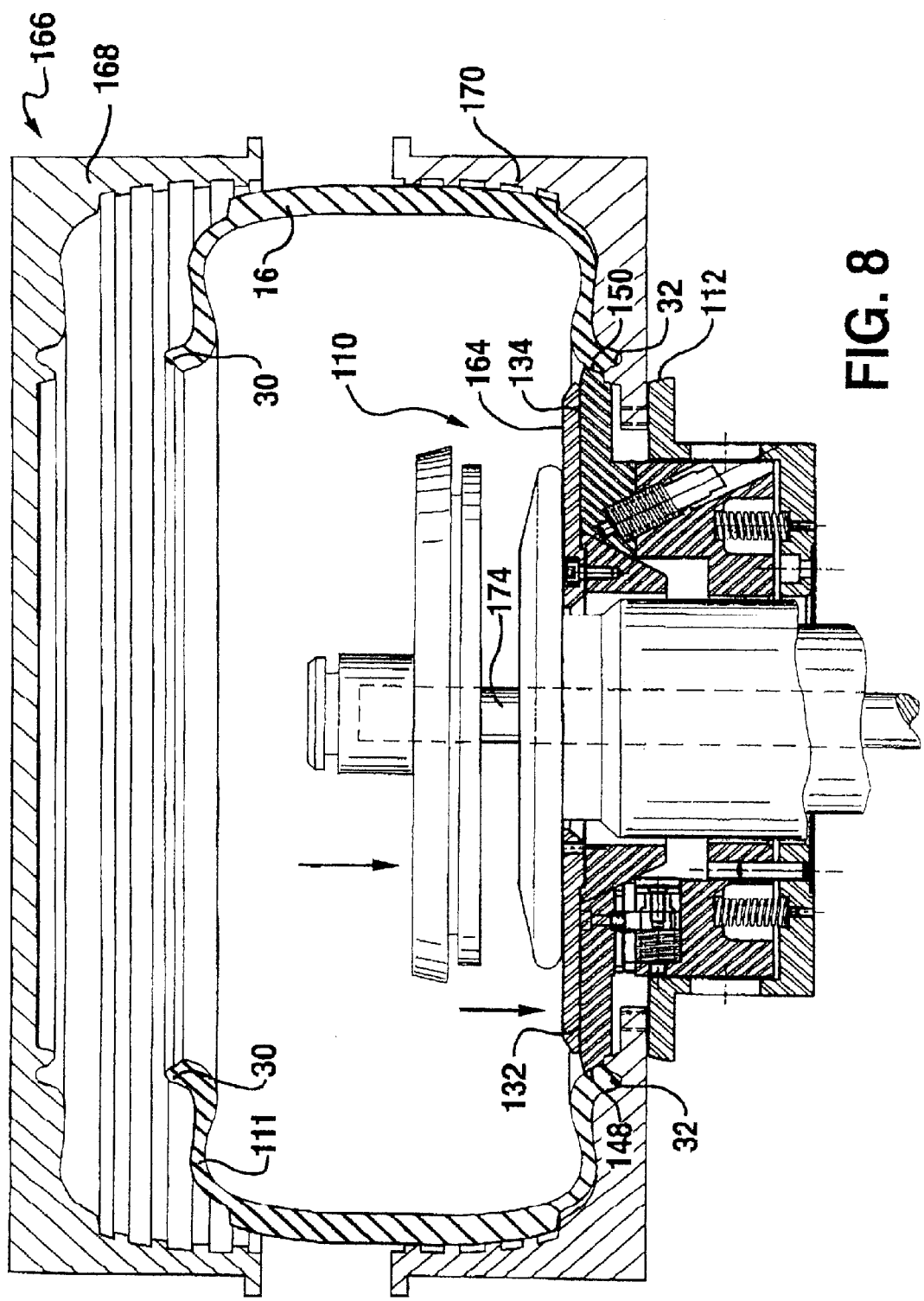
FIG. 8 is a cross-sectional view of an exemplary embodiment of the present invention in the expanded or closed position, and such embodiment is shown as it might be used with a curing press.

FIG. 7 and FIG. 8 depict mold element 110 being used in conjunction with a curing press 166. Curing is a step in the manufacturing process during which tread detail, lettering, and other features may be added while the tire 16 is subjected to heat and pressure. The shape of bead 30 or bead 32 is also formed during this step. Press 166 includes two halves 168 and 170 that are used to press or sandwich tire 16 during the curing step. As depicted, the press 166 is open in FIG. 7 and in FIG. 8. The internal walls of halves 168 and 170 include, for example, tread detail 172 for impression upon tire 16.

Referring generally now to FIGS. 4 through 8, mold element 110 includes a loading plate 112 that may be attached to the bottom of a curing press 166 or other tire manufacturing apparatus as desired. The internal surface 114 of loading plate 112 defines a cavity 116. Loading plate 112 also has a central axis AA, designated with dashed lines in FIGS. 5 and 6. Bolts or pins may be inserted through apertures 118 and 120 for orienting and attaching loading plate 112 to the curing press 166 or other equipment.

Base 122 is received within cavity 116 of loading plate 112 and has a first surface 126 and a second surface 124. Base 122 is movable in both directions along central axis AA. As shown, a plurality of springs 128 provide mechanical communication between first surface 126 of base 122 and loading plate 112. More specifically, loading plate 112 supports base 122 through the plurality of springs 128. Pins 130 operate to orient and guide the plurality of springs 128. As will be described below, the plurality of springs 128 are compressed when base 122 is moved towards loading plate 112 along axis AA and are therefore released as base 122 is moved away from loading plate 112.

Attached to the second surface 124 of base 122 in alternating positions are radial sectors 132 and floating sectors 134. For the exemplary embodiment of FIGS. 4 through 8, there are three such radial sectors 132 and three such floating sectors 134. As used here, "sector" describes the geometrical shape of two radii and the arc of at least one circle. The center of such circle defines an axial direction congruent or parallel with axis AA, and a radial direction that is perpendicular to the axial direction. For the exemplary embodiment illustrated, radial sectors 132 and floating sectors 134 are depicted as sections that together form a circular or annular disk having an aperture 136 (FIG. 4) positioned at its center. It should be understood, however, that the present invention may contain any number of sectors 132 and 134, and is not limited to only the use of six radial sectors 132 and floating sectors 134 nor to the use of sectors having the same shape as illustrated in FIGS. 1–6. Furthermore, sections having shapes other than as depicted for radial sectors 132 and floating sectors 134 may be used to form the overall circular or annular shape.

Referring again to the exemplary embodiment illustrated, each radial sector 132 is configured for reciprocal movement in a radial direction. More specifically, each radial sector 132 is configured for movement within a plane and direction that is perpendicular to central axis AA (shown in FIGS. 5–6). Pin 138 connects radial sector 132 to base 122 through link 140. Base 122 defines a chamber 142 housing a compressive spring 144 that is in mechanical communication with compressive link 140 through pin 146. As radial sector 132 moves in a radial direction away from axis AA, pin 146 and a portion of link 140 are constrained to move within chamber 142 and compressive spring 144 is compressed. As radial sector 132 moves in a radial direction towards axis AA, spring 144 is released.

Figure 5:
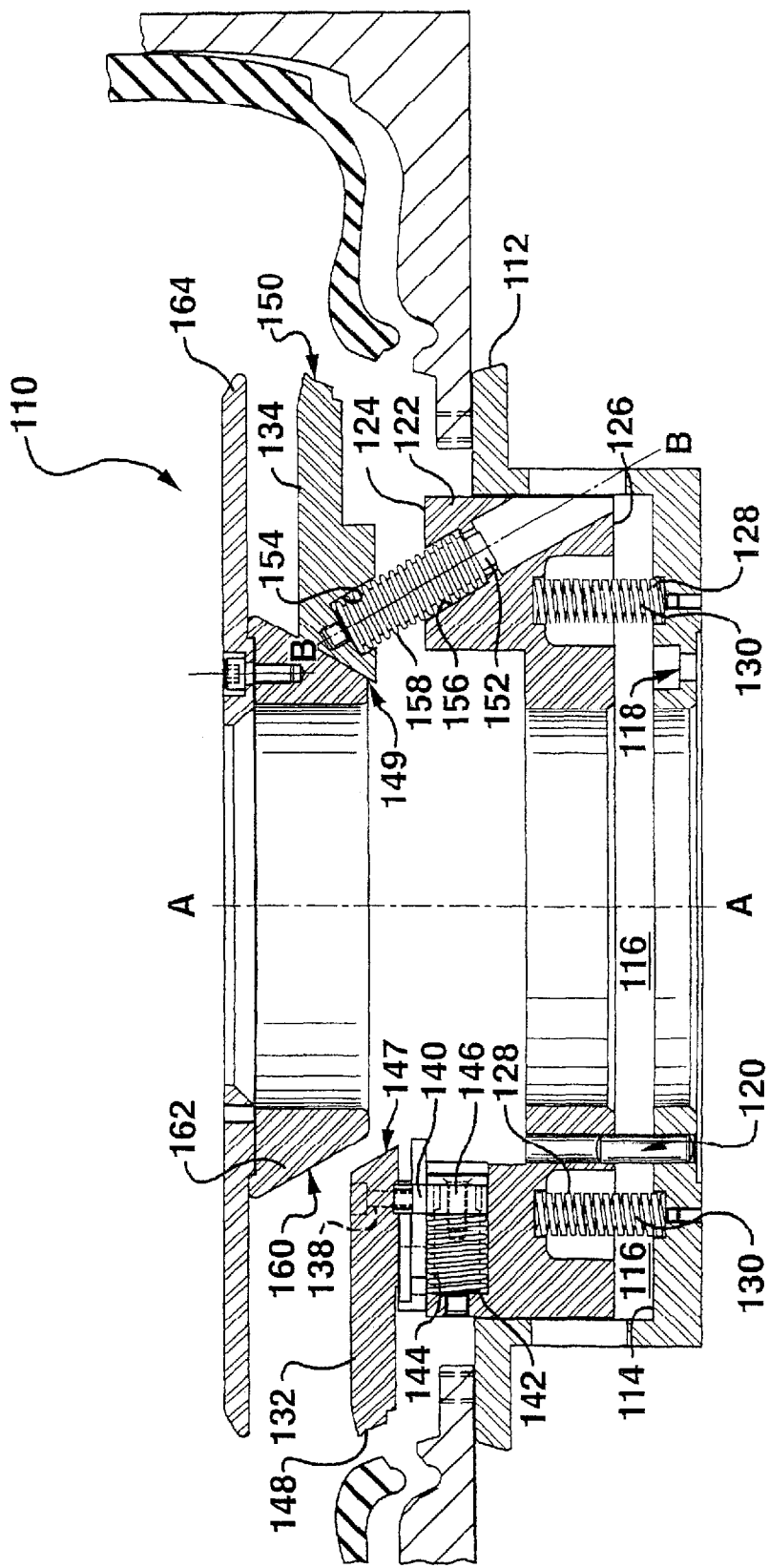
FIG. 5 is a cross-sectional view of an exemplary embodiment of the present invention in the collapsed or open position.
Figure 6:
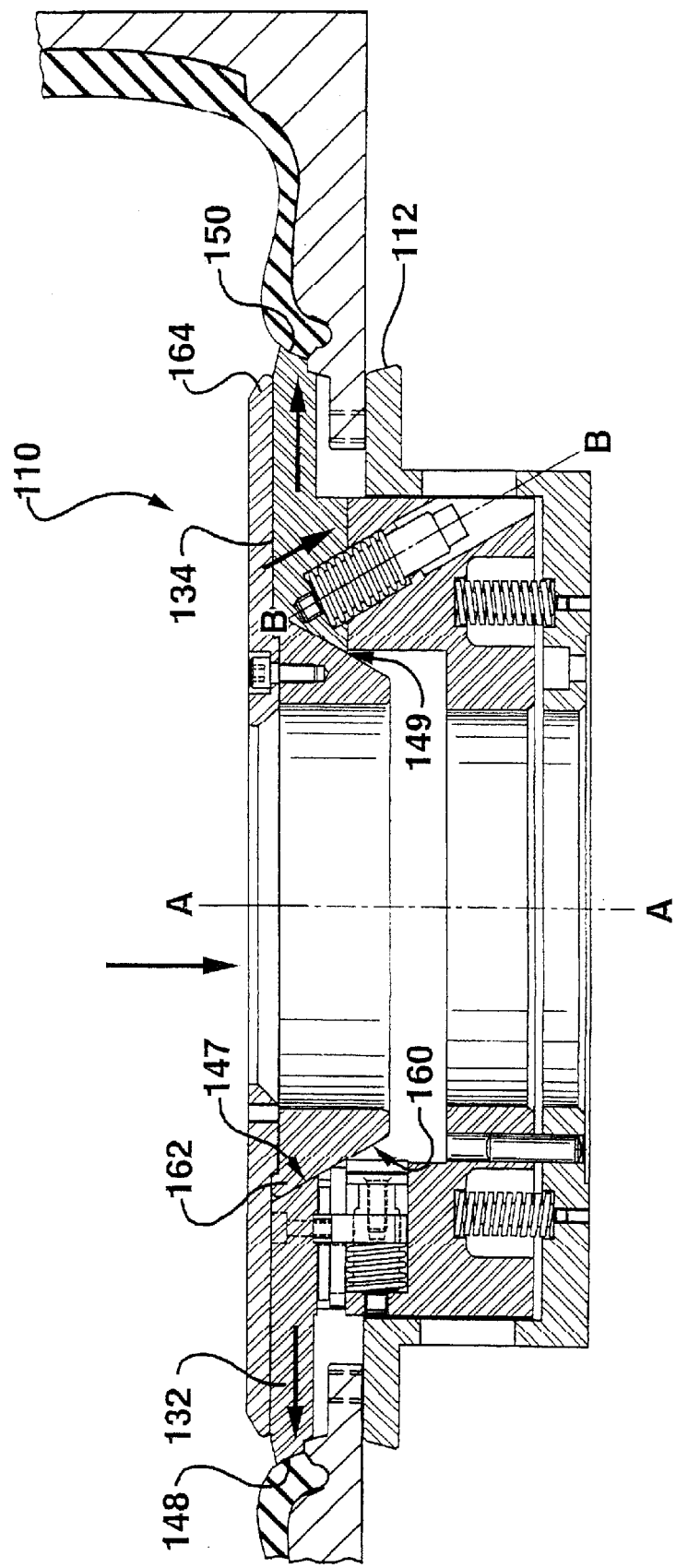
FIG. 6 is a cross-sectional view of an exemplary embodiment of the present invention in the expanded or closed position.

Each floating sector 134 is configured for reciprocal simultaneous radial and axial movement. More specifically, each floating sector 134 moves in a direction that is diagonal to axis AA. This direction is indicated by axis BB (FIGS. 5–6). Guide pin 152 connects floating sector 134 to base 122. When mold element 110 is in the expanded position shown in FIG. 6, guide pin 152 is contained within recesses 154 and 156 located in floating sector 134 and base 122 respectively. Guide pin 152 also operates in conjunction with compressive spring 158. Accordingly, as floating sector 134 is moved along axis BB, compressive spring 158 is compressed when floating sector 134 is moved towards base 122 and released when floating sector 134 moves away from base 122. In the preferred embodiment, axis BB forms an angle of 30 degrees as measured in a counter-clockwise direction from central axis AA. It should be understood, however, that the present invention is not limited to an angle of 30 degrees for axis BB, and other angles may be used as will be understood by one of ordinary skill in the art using the teachings disclosed herein.

Radial sectors 132 each have a drive surface 147 located along an inner radius, while floating sectors 134 each have a drive surface 149 located along an inner radius. These drive surfaces 147 and 149 are beveled and oriented for mating contact with a contacting surface 160 (FIG. 5) on actuator 162. More specifically, actuator 162 has a frustoconical-shaped contacting surface 160 for contacting and driving frustoconical-shaped surfaces 147 and 149. Preferably, contacting surface 160 is at an angle of 30 degrees as measured in a direction clockwise from central axis AA. However, it should be appreciated that other angles may be used for contacting surface 160 as will be understood by one of skill in the art using the teachings disclosed herein.

A top plate 164 is attached to actuator 162. Accordingly, as top plate 164 and actuator 162 are moved along axis AA towards base 122, contacting surface 160 contacts drive surfaces 147 and 149. Consequently, radial sectors 132 are driven in a radial direction outward from axis AA while floating sectors 134 are driven towards base 122 in a direction along axis BB. For the exemplary embodiment of molding element 110 depicted, floating sectors 134 and radial sectors 132 also engage and bear upon each other along angled surfaces 135 and 137. Surfaces 135 and 137 are preferably angled at 45 degrees; however, other angles may be used as will be understood by one of skill in the art using the teachings disclosed herein. In addition, the base 122 moves downward into the cavity 116 in the loading plate 112, which allows the continuous surface formed by the engaged sectors to come into contact with the tire bead with an axial movement.

Actuator 162 and top plate 164 may be powered by operation of a hydraulic piston or shaft 174 extending through aperture 136. However, one of ordinary skill in the art will understand that other means of powering actuator 162 and top plate 164 may be envisioned using the teachings disclosed herein.

Radial sectors 132 each have a tire bead molding surface 148 located along an outer radius. Similarly, floating sectors 134 each have a tire bead molding surface 150 located along an outer radius. When the exemplary embodiment being discussed is in the expanded position as shown in FIGS. 6 and 8 for example, the tire bead molding surface 148 of each radial sector 132 and the tire bead molding surface 150 of each floating sector 134 collectively form a continuous surface that presses against second bead 32. More specifically, the series of mating surfaces provided by surfaces 148, 150, 135, and 137 allow for the application of a uniform, continuous surface to second bead 32. Accordingly, mold element 110 is used to assist in shaping second bead 32 as desired while also molding a smooth surface along second bead 32 for creating a tight air seal. Mold element 110 also performs the secondary function of helping to secure the position of tire 16 during the curing step.

The present invention may be configured for use with first bead 30 and is not limited to using second bead 32 as will be understood by one of skill in the art using the teachings disclosed herein. More specifically, the orientation of tire 16 as shown in FIG. 5 and FIG. 6 is by way of example only.

An example of the operation of the exemplary embodiment 110 of the present invention will now be described. A tire 16 is placed into, for example, a curing press 166 and second bead 32 is placed over mold element 110. Top plate 164 and actuator 162 are then moved along axis AA towards loading plate 112 by operation of shaft 174. Contacting surface 160 then urges radial sectors 132 and floating sectors 134 from a collapsed or open position shown in FIGS. 5 and 7 to a closed or expanded position as shown in FIGS. 6 and 8.

More specifically, contacting surface 160 contacts and drives surfaces 147 so as to cause radial sectors 132 to move radially outward and floating sectors 134 to move along diagonal axis BB. Compressive springs 144 and 158 are compressed. The plurality of springs 128 are also compressed as base 122 is urged towards loading plate 112. As a result, tire seating surfaces 148 and 150 contact and apply pressure to second bead 32 and thereby provide a uniform pressure and a continuous, sealed molding surface against second bead 32. Radial sectors 132 and floating sectors 134 are now in a secure or clamped position as tire 16 is now fixed in place by mold element 110. Accordingly, mold element 110 can be used to mold second bead 32 into the shape desired and to provide a smooth surface for sealing air within the tire during operation.

Upon releasing or removing tire 16 from mold element 110, top plate 164 and actuator 162 are moved along axis AA away from loading plate 112. In turn, compressive springs 144 cause radial sectors 132 to move radially inward towards axis AA. Compressive springs 158 cause floating sectors 134 to move diagonally upwards along axis BB. Base 122 is also driven away from loading plate 112 by operation of the plurality of springs 128. As a result, tire seating surfaces 148 and 150 release pressure from second bead 32 allowing tire 16 to be removed. Radial sectors 132 and floating sectors 134 are now in a release position as tire 16 can now be removed from mold element 110.

It should be understood that the present invention includes various modifications that can be made to the embodiments as described herein as come within the scope of the appended claims and their equivalents. The aforementioned description of embodiments of the present invention is by way of example only and not intended as a limitation on the spirit and scope of the claims that follow.

What is claimed is:

1. A mold for a tire, comprising:
    a loading plate defining a cavity and having a central axis;
    a base received within said cavity, said base having an engagement surface, and being movable along said central axis;
    an actuator movable along said central axis between a spaced position and an engaged position relative to said base;
    at least one sliding section movably attached to said engagement surface, said sliding section movable in a direction perpendicular to said central axis between an engaged position and a retracted position, and having a molding surface for a tire bead;
    at least one floating section movably attached to said engagement surface and movable on a diagonal axis relative to said central axis between an engaged position and a retracted position, and having a molding surface for a tire bead, said at least one sliding section and at least one floating section being mutually alternately disposed; and,
    means for moving said actuator from the spaced position to the engaged position for driving said at least one sliding section and said at least one floating section to the respective engaged positions so that the respective molding surfaces join to form a continuous molding surface for a tire bead.

2. The mold according to claim 1, wherein said actuator has a frustoconically shaped driving surface and said at least one sliding section and said at least one floating section each have frustoconically shaped follower surfaces for being driven by the actuator.

3. The mold according to claim 1, wherein said at least one floating section is biased to the retracted position spaced along the central axis from said base and radially inward toward the central axis.

4. The mold according to claim 1, wherein said at least one sliding section is biased to the retracted position radially inward toward the central axis.

5. The mold according to claim 1, wherein said at least one floating section has at least one joining surface and said at least one sliding section has at least one joining surface which mutually bear on one another when the respective sections are in the engaged position.

6. The mold according to claim 1, wherein the base is biased to a raised position in said cavity in which the at least one sliding section is positioned axially spaced from a bead molding position, and wherein movement of the actuator moves the base to a recessed position in which the at least one sliding section is in the bead molding position.

7. The mold according to claim 1, wherein said diagonal axis is at an angle of about 30 degrees as measured in the counter-clockwise direction from said central axis.

8. A mold element for shaping a tire bead, comprising:
    a platform, said platform having a support surface;
    a base residing over said platform and having a first surface and a second surface, said base supported by a plurality of springs in mechanical communication with said first surface and said support surface;
    a plurality of floating sectors connected to said second surface and configured for simultaneous radial and axial movement, wherein each of said floating sectors has a tire bead molding surface located along the outer radius of said floating sectors and has a drive surface located along the inner radius of said floating sectors;
    a plurality of radial sectors connected to said second surface and configured for radial movement, wherein said radial sectors each have a tire bead molding surface positioned along the outer radius and each have a drive surface located along the inner radius; and
    an actuator having a contacting surface and positioned over said base;
    wherein upon causing said actuator to move towards said platform, said contacting surface of said actuator contacts said drive surfaces to move said plurality of floating sectors and said plurality of radial sectors so as to cause said tire bead surfaces to form a uniform, sealed surface for application to the tire bead.

9. A mold element for shaping a tire bead as in claim 8, wherein said floating sectors and said radial sectors matingly engage each other along adjoining angled surfaces.

10. A mold element for shaping a tire bead as in claim 8, wherein said actuator is beveled to form said contacting surface.

11. A mold element for shaping a tire bead as in claim 10, wherein said drives surfaces of said radial sectors and said floating sectors are frustoconically shaped.

12. A mold element for shaping a tire bead as in claim 11, further comprising a plurality of spring loaded members, mechanically connected between said floating sectors and said base, and configured for biasing said drive surfaces of said floating sectors against said contacting surface of said actuator.

13. A mold element for a tire, comprising;
    an annular disk comprised of a plurality of movable sectors, said annular disk having an axis about which the said sectors are radially located, each said movable sector having a molding surface located along its outer radius, wherein each said molding surface is configured for contact with a bead of the tire;

at least one of said plurality of movable sectors configured for radial movement between a release position and an engaged position;

at least one of said plurality of movable sectors configured for simultaneous radial and axial movement between a release position and an engaged position; and an actuator positioned above said annular disk and configured for selectively acting upon said annular disk so as to move said plurality of movable sectors between said release position and said engaged position;

wherein upon being placed into the engaged position, said mold surfaces of said plurality of movable sectors collectively form a continuous surface for molding the tire bead.

14. A mold element for a tire as in claim 13, further comprising a plurality of spring members connected to said plurality of movable sectors and configured for urging each movable sector from said engaged position to said release position.

15. A mold element for a tire as in claim 13, wherein said actuator has a frustoconically shaped contacting surface for acting upon said plurality of movable sectors.

16. A mold element for a tire as in claim 15, wherein each of said plurality of movable sectors has a pair of angled surfaces which mutually contact one another when said plurality of movable sectors are moved into said engaged position.

17. A mold element for a tire as in claim 15, further comprising a base in mechanical communication with and supporting said plurality of movable sectors.

18. A tire mold, comprising:

a circular member comprising a series of alternatingly disposed radial sectors and diagonal sectors, said radial sectors configured for movement in a radial direction between a release position, in which the tire may be placed upon or removed from the mold, and a secure position, in which a bead of the tire is in contact with said radial sectors and diagonal sectors, said diagonal sectors configured for movement simultaneously in both an axial direction and a radial direction between said release position and said secure position; and an actuating member positioned axially above said circular member, said actuating member configured for contacting said radial and diagonal sectors so as to selectively position said radial and diagonal sectors between said release position and said secure position;

wherein upon being placed into the secure position, said radial and diagonal sectors collectively create a uniform surface for contacting and molding the bead of the tire.

19. A tire mold as in claim 18, further comprising a base to which said circular member is connected, said base being configured for movement along an axial direction.

20. A tire mold as in claim 19, further comprising a platform in mechanical communication with and supporting said base.

21. A tire mold as in claim 20, wherein said mechanical communication is provided by a plurality of spring loaded members connecting said base and said radial and diagonal sectors, said plurality of spring loaded members being configured for urging said radial and diagonal sectors from said secure position towards said release position.

22. A tire mold as in claim 21, wherein each of said sectors has angled surfaces for mating contact with an adjacent said sector as said sectors are moved into the secure position.

* * * * *